Figure 2:
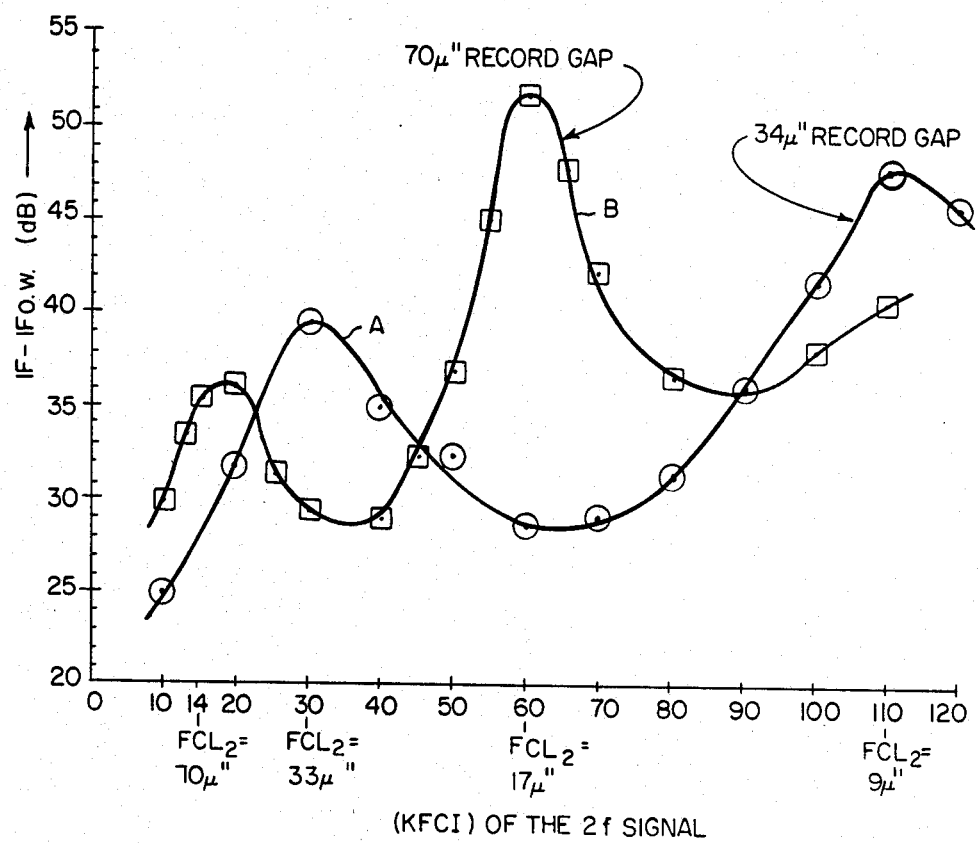

United States Patent [19]

Wachenschwanz et al.

[11] Patent Number: 4,642,718
[45] Date of Patent: Feb. 10, 1987

[54] OPTIMUM CONTROL OF OVERWRITE BY RECORD GAP LENGTH SELECTION

[75] Inventors: David E. Wachenschwanz, San Diego; Frederick J. Jeffers, Escondido, both of Calif.

[73] Assignee: Eastman Kodak Company, Rochester, N.Y.

[21] Appl. No.: 675,574

[22] Filed: Nov. 28, 1984

[51] Int. Cl.$^4$ .......................... G11B 5/25; G11B 5/02
[52] U.S. Cl. .................................. 360/119; 360/118; 360/66
[58] Field of Search ................................ 360/119–121, 360/118, 66

[56] References Cited

U.S. PATENT DOCUMENTS

| | | | |
|---|---|---|---|
| 3,049,698 | 8/1962 | Thompson et al. | 360/119 |
| 3,564,558 | 2/1971 | Tolman et al. | 360/119 |

FOREIGN PATENT DOCUMENTS

| | | |
|---|---|---|
| 18267 | 10/1980 | European Pat. Off. |
| 30301 | 6/1981 | European Pat. Off. |
| 1209600 | 1/1966 | Fed. Rep. of Germany |

OTHER PUBLICATIONS

Patent Abstracts of Japan, vol. 8, No. 175, (P-294)(1612) 8/11/84, Feinwerktechnik & Messtechnik, vol. 88, No. 2, 3/80, Munich, (DE).
H. H. Gatzen: "Schreib–Lese–Köpfe für Magnetplattenspeicher in konventioneller und Dünnfilm–Technologie", pp. 53–59.
*IEEE Transactions on Magnetics*, vol. 15, No. 6, 11/79, J. U. Lemke, "Ultra–High Density Recording with New Heads and Tapes", pp. 1561–1563.
*Electronics International*, vol. 55, No. 8, 4/82, J. Taranto, "Thin-Film Disks Drive Densities to New Highs", pp. 108–111.
Patent Abstracts of Japan, vol. 7, No. 38, (P-176)(1183), 2/16/83, Tijdschrift van het Nederlands Radiogenootschap, vol. 21, No. 1.
1/56, Eindhoven, (NL) W. K. Westmijze, "The Fundamentals of Magnetic Recording", pp. 1–15.

*Primary Examiner*—Robert S. Tupper
*Attorney, Agent, or Firm*—Robert F. Cody

[57] ABSTRACT

Given that there is a limit to the extent to which a record head may be excited before its pole tips saturate (gap fuzziness) while overwriting a second set of information signals atop a first set of information signals recorded in a high coercivity recording medium, the present invention concerns the discovery that if the record gap is dimensioned to equal approximately the flux change length that corresponds with a 2 f signal (FCL$_2$) recorded atop a 1 f signal, i.e. if the record gap is somewhere between about 0.7 and 1.5 times the flux change length associated with the 2 f signal, erasure of the 1 f signal (as well as other signals) will be most effective.

8 Claims, 6 Drawing Figures

FIG. 1
PRIOR ART
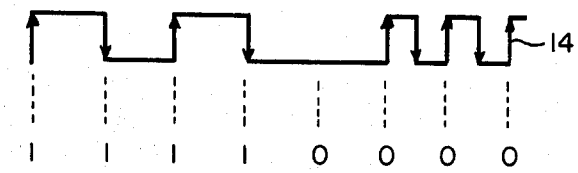
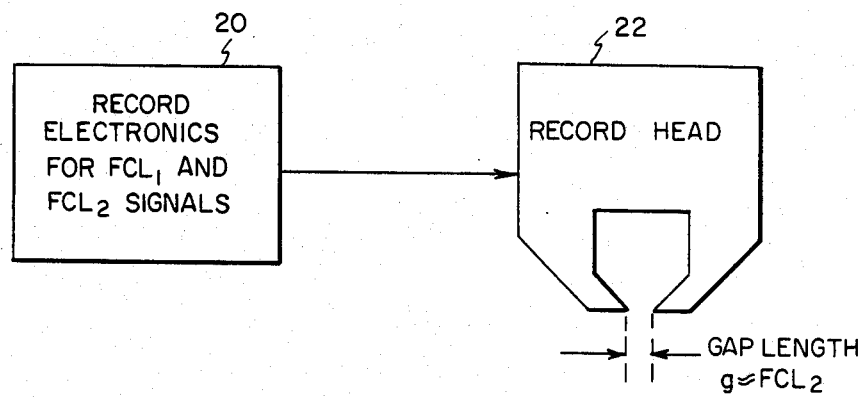
FIG. 4

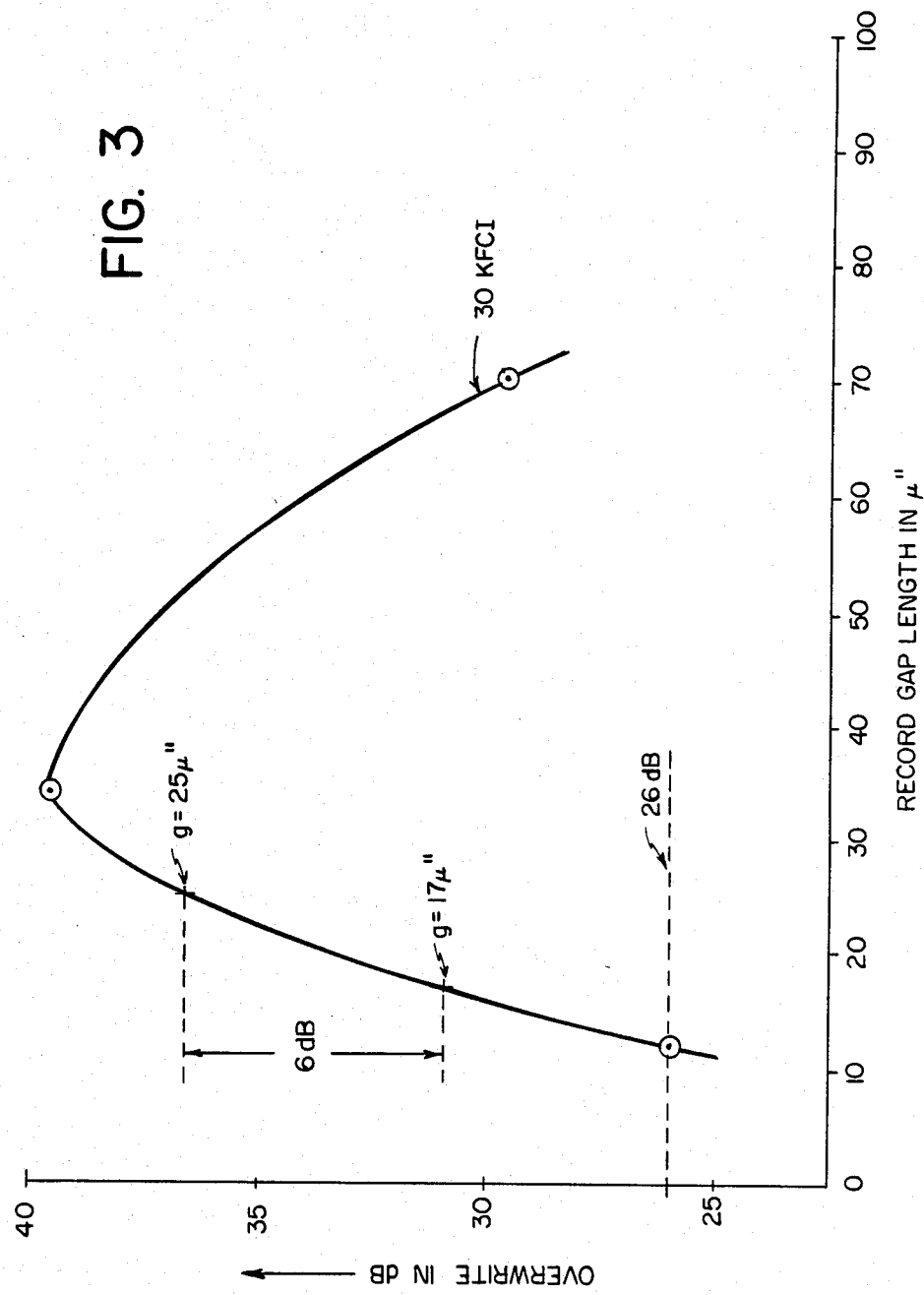

OPTIMUM CONTROL OF OVERWRITE BY RECORD GAP LENGTH SELECTION

BACKGROUND OF THE INVENTION

1. Field of the Invention

This invention relates in general to magnetic recording and, more particularly, to apparatus for maximizing the ability of a recorder to overwrite, and thereby erase, pre-recorded signal information.

2. Description Relative to the Prior Art

The invention is cast in the environment of the digital computer art: Although terms such as "bit length" and "wavelength" are used widely in the recording arts, a substitute term "flux change length" (FCL) is adopted herein for purposes of the present description, since such term most clearly addresses the workings of the invention. It will be understood that "flux change length" (FCL) shall be interpreted to mean the distance that occurs between successive data-representative flux changes within a recording medium. The term "data", in turn, shall mean information relating to and forming part of a bit-stream, and does not correspond to such signals as pilots, tracking signals and the like.

Tremendous effort is now—and has for sometime been—underway to pack more and more digitized signal information onto the surface of a magnetic recording medium such as a floppy disk. To pack signal information onto a magnetic recording surface is synonymous with saying that the flux change length FCL of signals so recorded shall be extremely small. To prevent demagnetization fields from knocking down short FCL signals, and/or producing excessive pattern-dependant bit shift, the recording medium should be of high coercivity. In order to record signal information onto a medium of high coercivity, however, a fairly intense field within the gap of the record head so employed must be used, albeit that such field will oftentimes cause pole tip saturation of the record head. As is known, pole tip saturation works to enlarge the effective gap of the record head and, most significantly, causes the edges of the effective gap to become fuzzy. Attendantly, two phenomena, both related to media coercivity, work to prevent effective overwriting atop pre-recorded signal information: 1. the "fuzzy" gap prevents sharp erasure-conducive transitions of and within the field associated with the overwriting signal and 2. the high coercivity of the recording medium, by its very nature, precludes easy erasure of the pre-recorded signal information.

In the current state of the digital computer art, modified frequency modulation (MFM) recording is in vogue: depending on the order of the recorded bits, f, 1.5 f, and 2 f signal components . . . where f corresponds to signal frequency . . . are processed. (In a typical MFM recording, a ONE, for example, calls for a "transition" for each bit, and a ZERO does not . . . except in the event the ZERO is followed by another ZERO; this, therefore, results in the production of f, 1.5 f, and 2 f signal components.) Accordingly, it is not uncommon to record 1 f signals atop 2 f signals, or 2 f signals atop 1.5 f signals, or 2 f signals atop 1 f signals, etc. . . . all without benefit of a separate pre-erasure step. Of the various recording practices, however, it has been found that the recording of a 2 f signal atop a pre-recorded 1 f signal is least effective from the standpoint of erasing the 1 f signal. As has been determined, if the "erased" 1 f signal is not at least 26 db below what it was prior to the recording of the 2 f signal, excess errors will occur during playback of data. (It will be appreciated that reference to MFM coding is merely representative of state-of-the-art coding; and that the invention may be practiced with any form of coding.)

TEST

An experimental procedure to define the effectiveness of erasing a 1 f signal by means of a 2 f signal calls for (a) recording a 1 f signal on a magnetic recording medium, and then measuring the playback strength of such 1 f signal (b) overwriting a 2 f signal atop the pre-recorded 1 f signal (c) again measuring the playback strength of the overwritten 1 f signal and (d) comparing the playback strength of the 1 f signal before overwriting to the strength of the playback 1 f signal after overwriting.

SUMMARY OF THE INVENTION

Given that there is a limit to the extent to which a record head may be excited before its pole tips saturate (gap fuzziness) while overwriting a second set of information signals atop a first set of information signals recorded in a high coercivity recording medium, the present invention concerns the discovery that if the record gap is dimensioned to equal approximately the flux change length that corresponds with a 2 f signal ($FCL_2$) recorded atop a 1 f signal, i.e. if the record gap is somewhere between about 0.7 and 1.5 times the flux change length associated with the 2 f signal, erasure of the 1 f signal (as well as other signals) will be most effective.

Figure 5A:
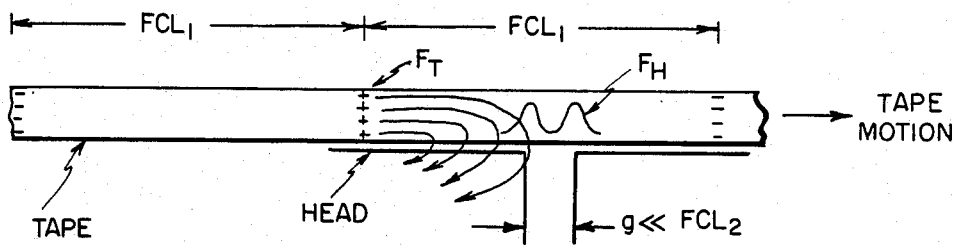
Figure 5B:
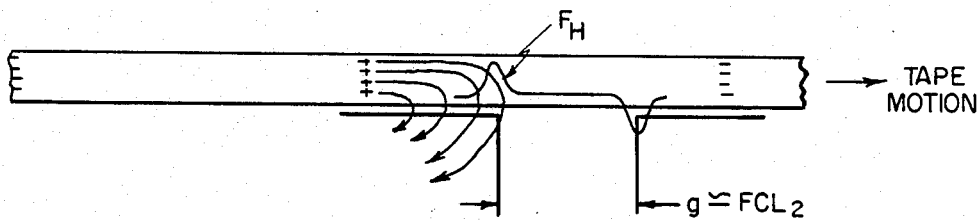

The invention, as well as certain aspects of the prior art, will now be described with reference to the figures of which FIG. 1 is a diagram illustrating prior art considerations which are useful for an understanding of the invention, FIG. 2 illustrates a pair of curves which have given rise to an appreciation of the concept of the invention, FIG. 3 illustrates another curve showing the advantages obtained by recording pursuant to the invention, FIG. 4 is a drawing illustrating apparatus according to the invention, and FIGS. 5A, 5B are diagrams useful in explaining what is preceived as the way in which the invention works to improve "overwriting" while recording pursuant to the invention.

Referring to FIG. 1, a representative MFM signal, as recorded, comprises a succession of flux changes within a recording medium. Per MFM coding, each bit corresponds with a discrete flux change if the bit is a ONE, and no flux change if the bit is a ZERO, unless that ZERO follows a next earlier bit that is a ZERO. Given that a wave 14 will be produced as a result of playback of the indicated recorded MFM signal, such signal will be rich in f, 1.5 f, and 2 f signal components, the flux change length $FCL_2$ being that which is associated with the 2 f signal component.

As indicated above, it is usual in the digital recording art to record one bit stream atop another bit stream without first erasing the earlier recorded bit stream. Attendantly, f, 1.5 f, and 2 f signals will, typically, get recorded atop other f, 1.5 f, and 2 f signals when using MFM coding. While it is important that there be virtually no playback of pre-recorded signals during playback of any post-recorded signals, the playback of pre-recorded 1 f signals—over which 2 f signals had been recorded—is most troublesome in this regard.

Following the practice of the aforenoted TEST, 1 f signals of varying kilo-flux changes per inch (KFCI) were recorded using a record gap of 34μ" (curve A). Thereafter, 2 f signals of varying kilo-flux changes per inch were recorded over the 1 f signals ... and then the "supposedly-erased" 1 f signals (1 f–1 f$_{o.w.}$) were reproduced. As indicated, the ability to erase a previously recorded 1 f signal by means of a 2 f signal varied as a function of the flux changes per inch associated with the 2 f signal. By converting flux changes per inch to flux change lengths, it turns out that there is a direct correlation between the flux change length FCL$_2$ of the 2 f signal and the record gap length for most effective erasure of an underlying 1 f signal, viz. a record gap length of about 34μ" was most effective in "2 f-erasing" a previously recorded signal of 1 f when the 2 f signals employed corresponded with a flux change length FCL$_2$ of about 34μ". The above test was then tried with a record gap of about 70μ" and—as corroboratively indicated by Curve B—was found to be most effective in "2 f-erasing" a pre-recorded 1 f signal when the 2 f signals employed corresponded to a flux change length FCL$_2$ of roughly 70μ". Other gap lengths vis-a-vis flux change lengths FCL$_2$ gave similar results. (It was further found that erasure of "any" signal by a 2 f signal was most effective when the record gap length approximated FCL$_2$.)

It is interesting to note that, as indicated in FIG. 2, the overwrite function—after reaching maxima at flux change lengths FCL$_2$ of 34μ" and 70μ", respectively, for record gaps of 34μ" and 70μ"—again reaches maxima when the employed flux change lengths FCL$_2$ are about one-fourth the record gap lengths. Notwithstanding this phenomenon, it will be appreciated that in order for this second-peak occurrence to be of any use whatsoever, separate playback heads, of necessity, would have to be utilized. That is, although 34μ" and 70μ" gaps are capable of reproducing respective flux change length signals of 34μ" and 70μ" (wavelengths: 68μ" and 140μ" respectively), such gaps are intrinsically incapable of reproducing respective recorded flux change length signals of 9μ" and 16μ" (wavelengths: 18μ" and 32μ" respectively).

Given the arduous task of recording 30 KFCI $$\left( FCL_2 = \frac{1}{3 \times 10^4 \text{ KFCI}} = 33\mu" \right)$$

in connection with the recording of 10 megabytes of data on a standard 5¼ inch floppy disc (see FIG. 3), 6 db of overwrite gain (to about 37 db) can be achieved by merely increasing the gap length g of the record head from 17μ" to 25μ" ... and, correspondingly, those 6 db of gain can be lost by using too large a record gap length of 70μ".

With the teaching of FIGS. 2 and 3 in mind, then, reference should now be had to FIG. 4. As indicated, a source 20 of electronic signals produces and applies data signals of flux change lengths FCL$_1$, FCL$_2$ to a record head 22 for recording in a recording medium (not shown). The length of the record gap of the record head 22 is chosen to equal, approximately, the flux change length FCL$_2$ of the 2 f signals produced by the source 20, whereby the ability of the head 22 to overwrite effectively ... without need for a pre-erasure procedure ... prerecorded 1 f signal information of flux change length FCL$_1$ is maximized.

A fair amount of speculation has been advanced for an explanation as to why the observed phenomenon occurs: Generally, it is thought that "flux-change-interaction" by both the leading and trailing edges of a record gap is maximized when the record gap length equals the length of the FCL$_2$ signals which it records. This may be appreciated, firstly, from FIG. 5A which shows a transducer gap g that is very small in relation to the length of a recorded FCL$_1$ signal. Those tape particles which exhibit a high coercivity are "1 f-recorded" at the leading edge of the gap g by the horizontal component F$_H$ of the field from the head, as modulated by the field F$_T$ from the 1 f transition that is upstream of the gap. Since the gap depicted in FIG. 5A is very small, when the tape moves the length of the gap, the field F$_H$ direction remains unchanged and the same spot is again "1 f-recorded" in the same direction. If, however, the gap g has a length that approximates FCL$_2$, as depicted in FIG. 5B, then as particles which were "1 f-recorded" at the gap leading edge reach the gap trailing edge, the head field F$_H$ reverses, thus erasing the 1 f signal that was recorded at the leading edge of the gap.

The invention has been described in detail with particular reference to certain preferred embodiments thereof, but it will be understood that variations and modifications can be effected within the spirit and scope of the invention.

What is claimed is:

1. In apparatus for efficiently overwriting atop, thereby to erase, a first magnetically recorded signal having a given flux change length by means of a second signal having a second flux change length that is one half as great as that of said first signal, the improvement wherein the length of the gap of the record head of said apparatus is approximately the same as the flux change length of said second signal.

2. The improved apparatus of claim 1 wherein the length of the gap of said record head is between 0.7 and 1.5 times the flux change length of said second signal.

3. In magnetic recording apparatus for use in the recording of one or more discrete frequencies, and for efficiently recording signals of a first given discrete frequency directly over signals of a second given discrete frequency that is one half as great as the first given discrete frequency, a record head having a gap length that is approximately equal to the flux change length, as recorded, of signals having said first given frequency.

4. In combination
   a. signal processing apparatus for use in magnetically recording, upon a relatively moveable magnetic medium, a first information signal of a given frequency directly atop, thereby to erase, a prerecorded second information signal having a frequency which is one half that of said given frequency, and
   b. a magnetic record head having a transducer gap length which is within the range of 0.7 to 1.5 times the recorded flux change length that is associated with the recorded first information signal.

5. Magnetic recorder apparatus comprising
   a. a source of 1 f and 2 f electrical signals, where f represents "signal frequency", b. a gapped magnetic record record head connected to receive and convert the 1 f and 2 f electrical signals received thereby into magnetic 1 f and 2 f signals at the gap of said head, and c. means for providing relative motion between said record head and a magnetic medium disposed to record said 1 f and 2 f magnetic signals produced at the gap of said head, the gap of said head having a length which is approximately the same as the flux change length, as recorded, of said 2 f magnetic signals, whereby when said 2 f signals are overwritten atop said 1 f signals, said overwritten 1 f signals are effectively erased.

6. The recorder apparatus of claim 5 wherein the gap length of said head is between 0.7 and 1.5 times the flux change length of said recorded 2 f magnetic signals.

7. Recorder apparatus as in claim 5 wherein said source of 1 f and 2 f electrical signals is means for producing data in the form of MFM coding.

8. The recorder apparatus of claim 7 wherein the gap length of said head is between 0.7 and 1.5 times the flux change length of said recorded 2 f magnetic signals.

* * * * *